3,072,459
PROCESS FOR PRODUCING FLUORIDE-FREE COLUMBIUM OR TANTALUM PENTOXIDE
Raymond A. Foos, Freemont, Ohio, and Robert L. Ripley, Lockport, N.Y., assignors to Union Carbide Corporation, a corporation of New York
No Drawing. Filed Dec. 30, 1959, Ser. No. 862,809
5 Claims. (Cl. 23—23)

This invention relates to a method for producing columbium and/or tantalum pentoxides substantially free from fluorine contamination.

In the purification and separation of tantalum and columbium values, from solid starting materials such as the ores of these metals, it is common practice to first solubilize the metal values in an aqueous acid solution containing fluorides. The tantalum and columbium values are then extracted from the acid solution with an organic solvent; the extracted metal values are then selectively stripped from the organic phase with an aqueous solution. The aqueous strip liquor is treated so as to precipitate tantalum and columbium oxides. A typical analysis of a wet filter cake from a tantalum precipitate is 7 percent fluorine, 3 percent ammonia, 40 percent water and 50 percent tantalum pentoxide. A typical analysis of a columbium wet cake is 4 percent fluorine, 2 percent ammonia, 60 percent water and 34 percent columbium pentoxide.

As may be seen from these analyses, the cakes contain a high percentage of fluoride material. Before either of the metal oxide materials can be processed to the elemental metal, the water of hydration and the fluorides must be removed. The presence of fluorine lowers the metal recovery and fouls and corrodes the reduction equipment. Further, for direct sale of the cake material, a low fluorine content is required, since the usual commercial fluoride specification for saleable oxides is a maximum of 0.1 percent.

In the aqueous extracts and aqueous strip liquors obtained in the separation of columbium and tantalum the columbium is generally present as $H_2CbF_7$ or $H_2CbOF_5$ and the tantalum as $H_2TaF_7$. The precipitated material generally contains fluorine also and it is believed the compounds precipitate as $CbOF_3$ and $TaOF_3$. Many attempts have been made to remove the fluoride contamination but these methods generally involve special equipment because of the corrosive nature of the fluoride ion. Other methods, for example washing with water, have proven unsuccessful to obtain a fluorine content of less than about 4 percent.

Accordingly, it is an object of this invention to provide a process for the production of columbium and tantalum pentoxides by means of which columbium and tantalum pentoxides containing less than about 0.1 percent of fluoride contamination may be obtained.

Other objects will be apparent from the subsequent disclosure and appended claims.

The process which satisfies the objects of the present invention comprises treating a fluoride solution containing columbium values in the form of $H_2CbF_7$ and $H_2CbOF_5$ and/or tantalum values in the form of $H_2TaF_7$ with at least 2½ moles of sulfuric acid for each mole of $H_2CbF_7$ and $H_2TaF_7$ in the fluoride solution and at least 1½ moles of sulfuric acid for each mole of $H_2CbOF_5$ in the fluoride solution and digesting said acid treated solution by boiling it whereby the fluorine is dissociated from the metal compound and volatilized during the digestion as gaseous hydrogen fluoride.

In the preferred form of the invention the fluoride solution containing the metal values is treated with at least 3½ moles of sulfuric acid for each mole of $H_2CbF_7$ and $H_2TaF_7$ in the fluoride solution and at least 2½ moles of sulfuric acid for each mole of $H_2CbOF_5$ in the fluoride solution. Excesses of sulfuric acid over this amount may be advantageously employed in accordance with the dictates of the economics of the process.

When the fluorine has satisfactorily been removed by volatilization as hydrogen fluoride, precipitating reagent is added to precipitate the metal values as hydrated pentoxides substantially free from fluoride contamination.

The metal components of the solution which have been freed from fluorine may be precipitated by adding a base such as ammonium hydroxide. However, if the amount of concentrated sulfuric acid employed is substantially in excess over that necessary to remove the fluoride contamination, no further precipitating agent need be added. The precipitated material is then separated from the mother liquor.

To illustrate the process of the present invention 25 milliliters of a hydrofluoric acid solution of 3.80 grams of $Ta_2O_5$ were digested with 5 milliliters of concentrated sulfuric acid. The mixture was boiled until the hydrogen fluoride was completely volatilized. A stoichiometric amount of ammonium hydroxide was then added and 100 percent recovery of tantalum as a hydrated oxide containing only 0.06 percent fluorine was obtained. The precipitated hydrated oxide was calcined at about 500° C. to insure elimination of any residual sulphur. Analysis of the calcined metal showed a sulphur content of less than 0.005 percent.

To illustrate the process wherein sulfuric acid is employed as the precipitating reagent, a mixture consisting of 25 milliliters of concentrated sulfuric acid and 25 milliliters of an aqueous hydrofluoric acid solution of 3.80 grams of $Ta_2O_5$ was boiled to evolve gaseous hydrogen fluoride. Once the fluorine was eliminated, the tantalum automatically precipitated from the solution in the form of a hydrated oxide containing 1.9 percent fluorine. The product was calcined and the calcined material was analyzed and found to contain less than 0.005 percent sulphur.

Where the columbium or tantalum product is eventually to be converted to the corresponding pentachloride up to about 2 percent fluorine is not harmful. For the preparation of the pure pentoxide, however, the preferred method of digesting with smaller quantities of sulfuric acid and precipitating with ammonium hydroxide is preferred.

What is claimed is:
1. A process for producing a substantially fluoride-free pentoxide of at least one metal selected from the group consisting of columbium and tantalum from an aqueous hydrofluoric acid solution containing a compound selected from the group consisting of $H_2CbF_7$, $H_2CbOF_5$ and $H_2TaF_7$ which process comprises adding at least 2½ moles of sulfuric acid to said solution for every mole of $H_2CbF_7$ and $H_2TaF_7$ contained therein and at least 1½ moles of sulfuric acid for every mole of $H_2CbOF_5$ contained therein; digesting the so-acidified solution by boiling it whereby the combined fluorine is dissociated from the metal compounds and volatilized during said digestion as gaseous hydrogen fluoride; continuing said digestion until the evolution of gaseous hydrogen fluoride from said solution has substantially subsided; and precipitating said selected metal from the solution as a hydrated pentoxide of said metal.

2. A process in accordance with claim 1 wherein the amount of sulfuric acid added is insufficient for the precipitation of the metal values and wherein ammonium hydroxide is added to the digested solution to precipitate the selected metal pentoxide.

3. A process in accordance with claim 1 wherein at least 3½ moles of sulfuric acid are added to said solution in the acidification step for every mole of $H_2CbF_7$ and $H_2TaF_7$ contained therein and at least 2½ moles of sulfuric acid for every mole of $H_2CbOF_5$ contained therein.

4. A process in accordance with claim 3 wherein the amount of sulfuric acid added is insufficient for the precipitation of the metal values and wherein ammonium hydroxide is added to the digested solution to precipitate the selected metal pentoxide.

5. A process in accordance with claim 3 wherein a substantial excess of sulfuric acid is added to said solution in the acidification step whereby the selected metal pentoxide precipitates from the digested solution without additional treatment.

References Cited in the file of this patent

UNITED STATES PATENTS

| | | |
|---|---|---|
| 2,795,481 | Hicks et al. | June 11, 1957 |
| 2,819,146 | Ruhoff et al. | Jan. 7, 1958 |
| 2,819,945 | Ruhoff et al. | Jan. 14, 1958 |
| 2,950,966 | Foos | Aug. 30, 1960 |
| 2,953,453 | Foos | Sept. 20, 1960 |
| 2,980,496 | Wettler | Apr. 18, 1961 |

OTHER REFERENCES

Jacobson: "Encyclopedia of Chemical Reactions," Reinhold Pub. Corp., New York, 1958, vol. 7, Reaction VII–690, page 166.